Dec. 31, 1940.　　　A. L. KRONQUEST　　　2,227,190
MACHINE FOR TREATING AND SEALING FILLED CONTAINERS
Filed April 15, 1938　　　7 Sheets-Sheet 1

Inventor
Alfred L. Kronquest
By Mason & Porter
Attorneys

Dec. 31, 1940.    A. L. KRONQUEST    2,227,190
MACHINE FOR TREATING AND SEALING FILLED CONTAINERS
Filed April 15, 1938    7 Sheets-Sheet 2

Dec. 31, 1940.　　A. L. KRONQUEST　　2,227,190
MACHINE FOR TREATING AND SEALING FILLED CONTAINERS
Filed April 15, 1938　　7 Sheets-Sheet 3

Inventor
Alfred L. Kronquest
By Mason & Porter
Attorneys

Dec. 31, 1940. A. L. KRONQUEST 2,227,190
MACHINE FOR TREATING AND SEALING FILLED CONTAINERS
Filed April 15, 1938 7 Sheets-Sheet 6

Inventor
Alfred L. Kronquest
Mason & Porter
Attorneys

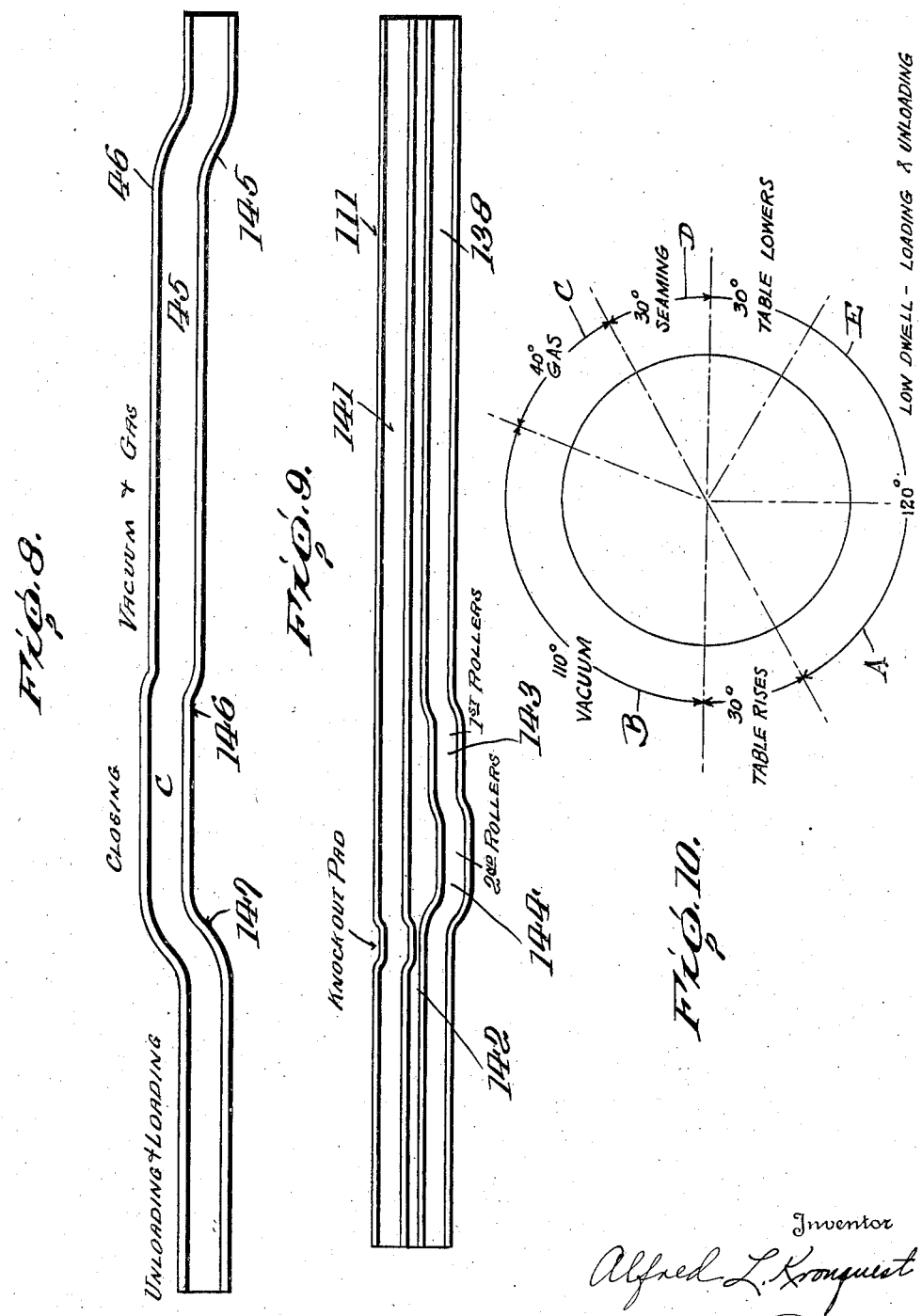

Patented Dec. 31, 1940

2,227,190

UNITED STATES PATENT OFFICE 2,227,190

MACHINE FOR TREATING AND SEALING FILLED CONTAINERS

Alfred L. Kronquest, Syracuse, N. Y., assignor to Continental Can Company, Inc., New York, N. Y., a corporation of New York Application April 15, 1938, Serial No. 202,328

16 Claims. (Cl. 226—68)

The invention relates generally to the art of treating filled containers and primarily seeks to provide a novel machine for first drawing a vacuum in the filled containers, then replacing the vacuum with a gas, and then double seam sealing the container, all in one continuous operation.

Machines have heretofore been devised for drawing a vacuum in filled containers, and then replacing the vacuum with a heavy, air excluding gas, but in all such machines of which I have knowledge, the filled and treated containers must be conveyed from the treating station or stations to a closing or sealing station, and in the short space of time consumed in transit to the sealing station whereat sealing is effected at atmospheric pressure, a portion at least of the heavy gas becomes displaced and permits ingress of the surrounding atmosphere sought to be excluded. An example of this type of machine is to be found in the United States Letters Patent 1,975,011 issued to A. L. Kronquest et al., September 25, 1934. Among the objects of the invention is that of providing means for avoiding the objectionable condition referred to by effecting the sealing of the filled container directly in the chamber in which the vacuum is drawn therein and in which the vacuum is replaced by the gas, all contact with the surrounding atmosphere being definitely prevented prior to completion of the sealing function.

In its more detailed nature the invention resides in the provision of a novel machine of the character stated embodying a rotatable table formed of novel lift sectors, means for feeding the filled containers to and the treated and sealed containers from said table, a turret rotatable with the table and supporting thereon a plurality of treating and sealing chambers or bells, each embodying a sealing unit therein including a chuck and double seaming rollers, means for actuating the sealing units, means for controlling the vacuumizing, gassing and sealing of the filled containers in groups all in a continuous cycle completed during each rotation of the table and with the containers sealed within the bells against contact with the surrounding atmosphere during the whole of each cycle.

Another object of the invention is to provide novel means embodied in the table structure for lifting the containers a distance in groups to seal them in the bells against contact with the surrounding atmosphere and out of pressure contact with the chucks during the drawing of the vacuum therein and the gassing thereof, and then for lifting the containers an additional distance to maintain the atmospheric pressure air exclusion and bring about pressure contact with the chucks incident to the double seam sealing operations thereon.

Another object of the invention is to provide novel means for adjusting the machine to adapt it for operations upon containers of different sizes.

With the above and other objects in view that will hereinafter appear, the nature of the invention will be more clearly understood by following the description, the appended claims, and the several views illustrated in the accompanying drawings.

In the drawings:

Figure 8 is a diagrammatic development of the cam which controls the position of the table sectors.

Figure 9 is a diagrammatic development of the cam equipment by which the seaming rollers and the knockout pad are actuated.

Figure 10 is a diagrammatic view illustrating the positions at which the loading and unloading, the vacuumizing, the gassing and the closing or seaming of the cans are effected.

Figure 11 is a fragmentary horizontal section illustrating one of the double seaming device actuator guiding brackets.

Figures 12 and 13 are detail perspective views illustrating the actuator devices which are slidably mounted in one of the guide brackets.

Figure 1:
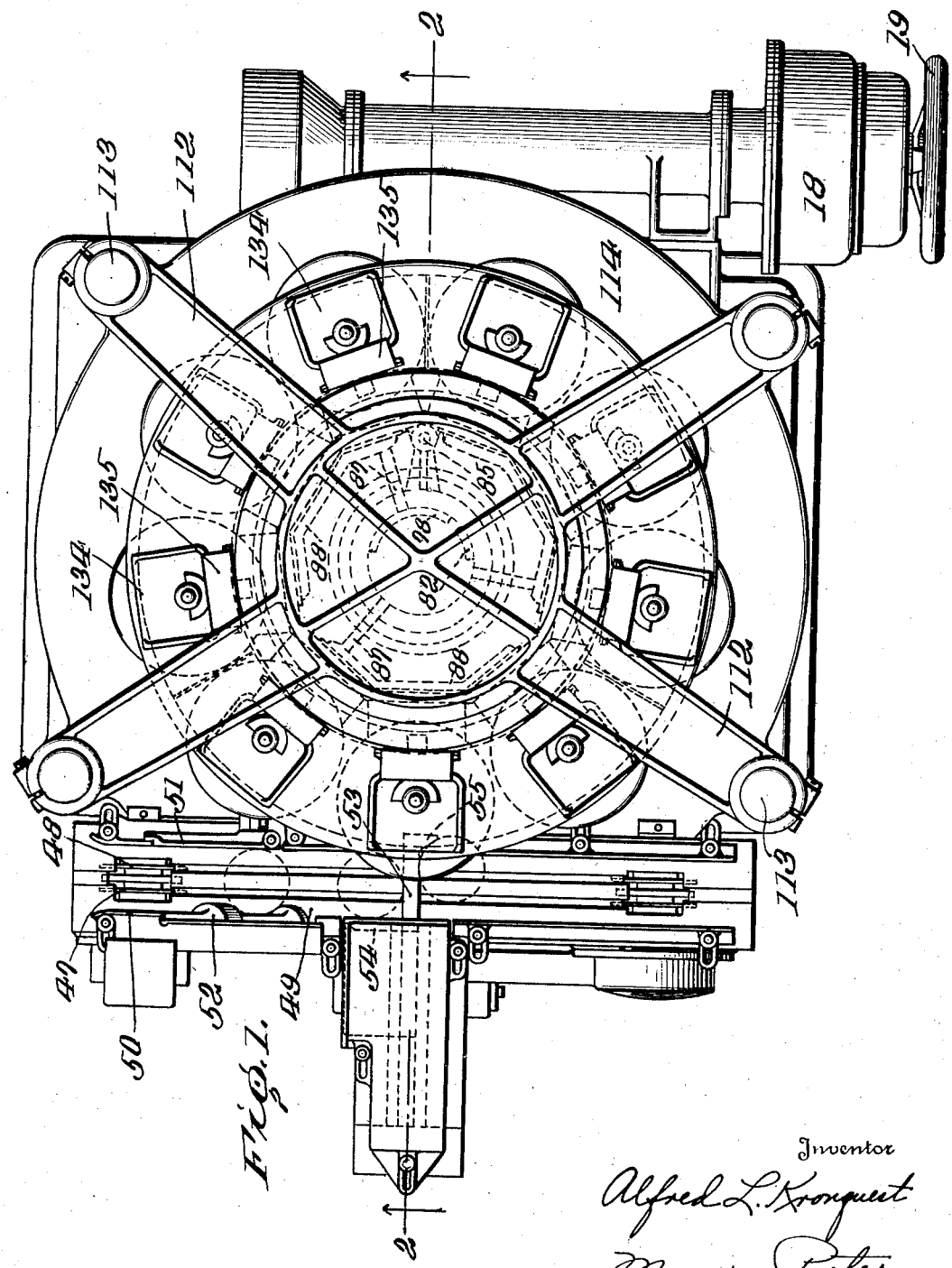
Figure 1 is a plan view illustrating the invention.

The machine herein illustrated includes a supporting base 5 carrying a vertically arranged column 6 which is fixed to the supporting base.

Mounted for rotation around said column is a turret sleeve 7. Said turret sleeve is mounted on a ball bearing 8 of any desired construction. Attached to the turret sleeve 7 is a ring bracket 9 secured to the turret sleeve by bolts 10. This ring bracket 9 is provided with gear teeth 11 on its outer periphery, and a driving pinion 12 (see Figure 2) meshes therewith and imparts rotation to the turret. The pinion 12 is fixed to the upper end of a shaft 13 which is mounted in a suitable bearing bracket 14 carried by the base of the machine. The shaft 13 is also provided with a worm gear 15 intermediate the ends thereof, which meshes with a worm gear 16 on a horizontal shaft 17 (see Figure 2). This horizontal shaft 17 is driven through a clutch member and a belt wheel mounted within the housing 18. The shaft 17 may also be turned by hand wheel 19. The specific means for rotating the turret forms no part of the present invention and may be of any suitable construction, or as shown in the United States Letters Patent to Kronquest et al., 1,975,011 of September 25, 1934.

Figure 6:
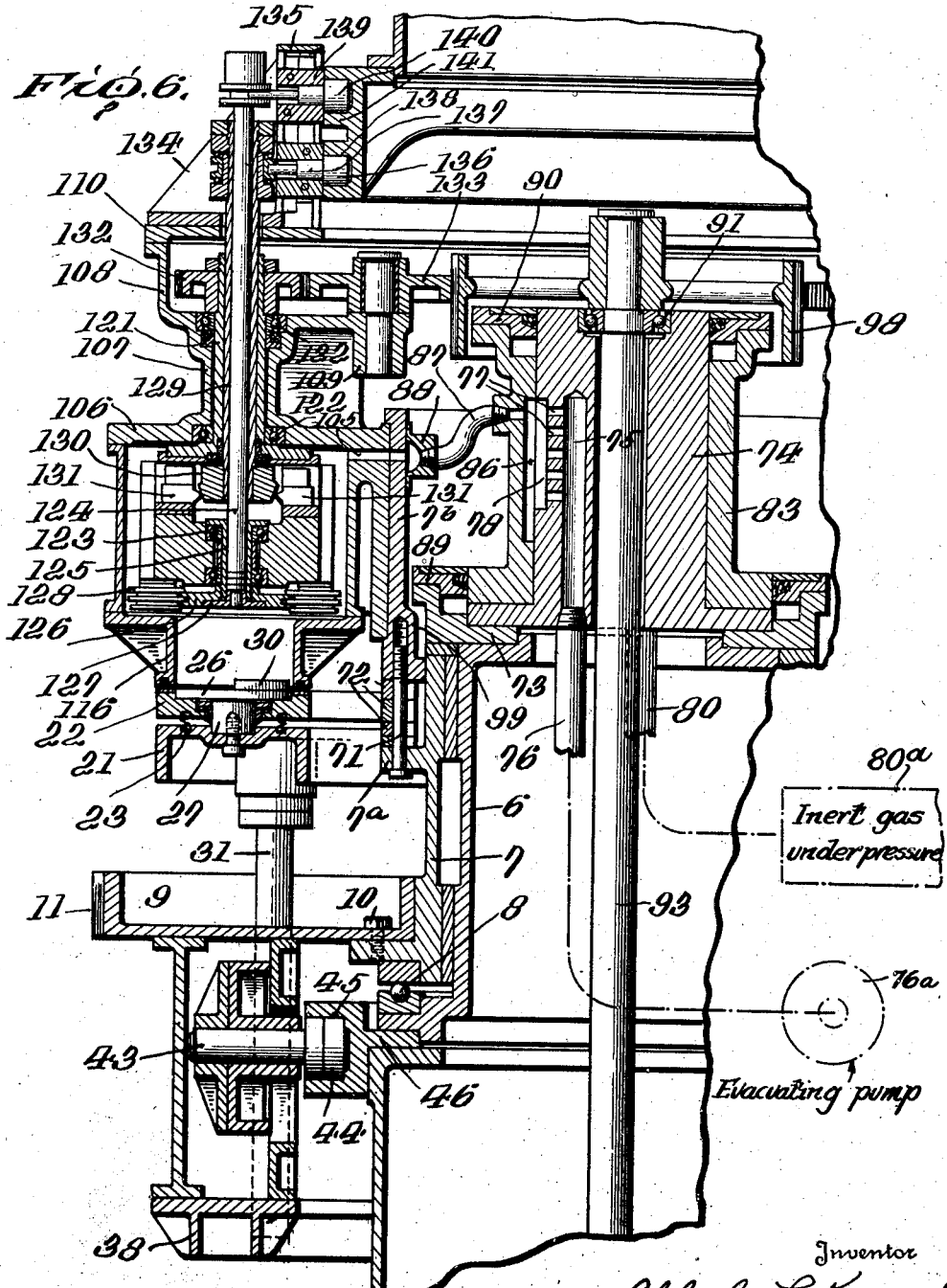
Figure 6 is an enlarged fragmentary vertical section taken through the axis of the machine and of one of the bell units, the table sector being shown elevated to the can vacuumizing and gassing position.
Figure 7:
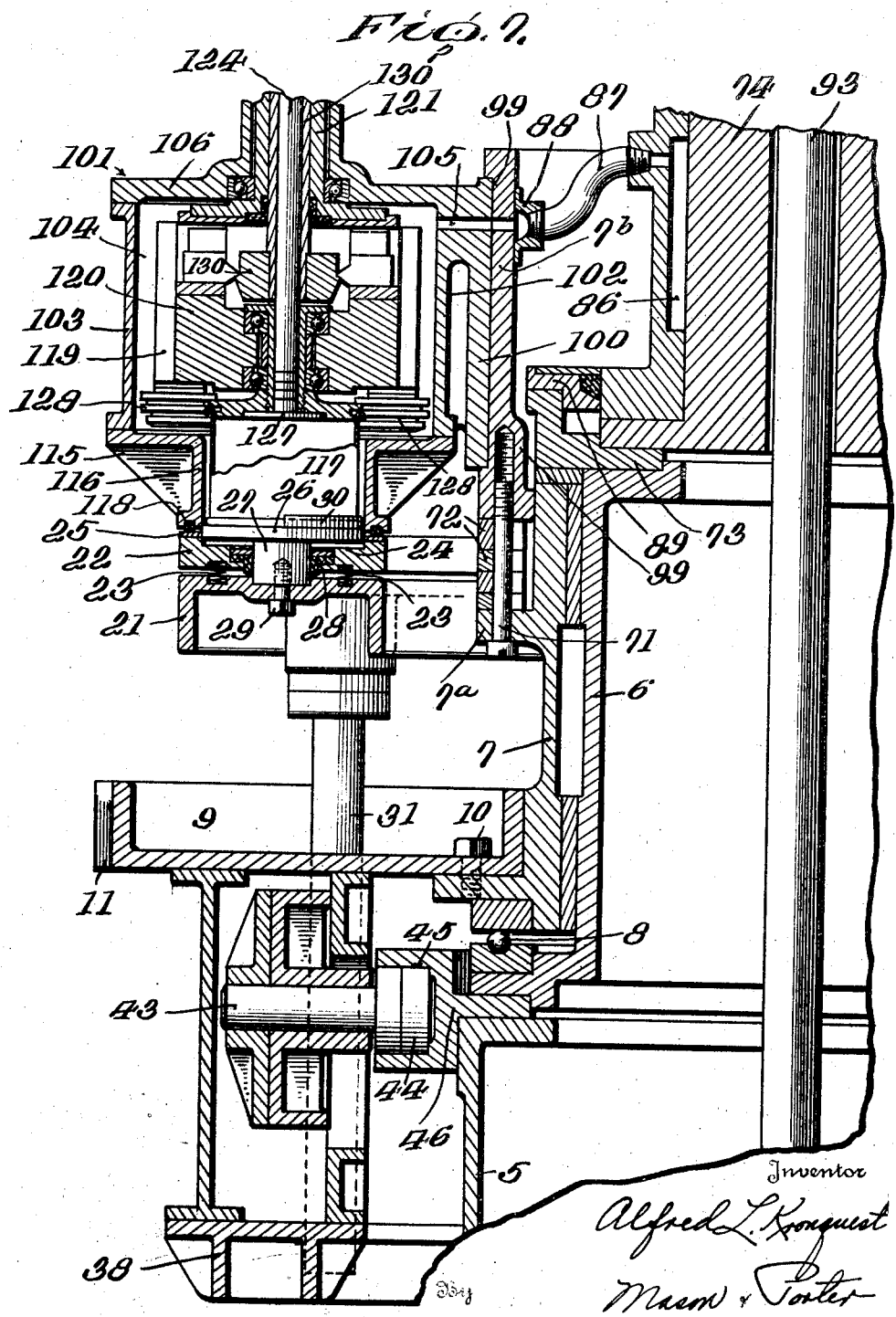
Figure 7 is an enlarged vertical section through the axis of one of the bell units, the table sector being illustrated as elevated to the position in which the can seaming operation is performed.

A table generally designated 20 is rotatable with the turret and is in the nature of an annular ring formed of three sectors, each comprising 120 degrees, or one-third of the whole. The table sectors are capable of being individually lifted and lowered, in a manner later to be described, and each comprises a lower main body portion 21 and an upper body portion 22 yieldably spaced from the lower body portion by springs 23 interposed between said portions as shown in Figures 4, 6 and 7 in the drawings.

Each body portion 22 is equipped with three recesses 24. The recesses are equi-distantly spaced and are surrounded by seating rings or a seating plate indicated at 25. A can supporting pad 26 occupies each recess 24 and is mounted on a stem 27 which depends from the pad and is operable through a packed aperture 28 formed in the table body 22. Each stem is secured as at 29 to the table body 21. The can supporting pads normally lie flush with the top surface of the plate 25 on the table portion 22, and each pad of each table sector is equipped with a can centering flange 30 for positioning cans received on the pads centrally of said pads.

Figure 2:
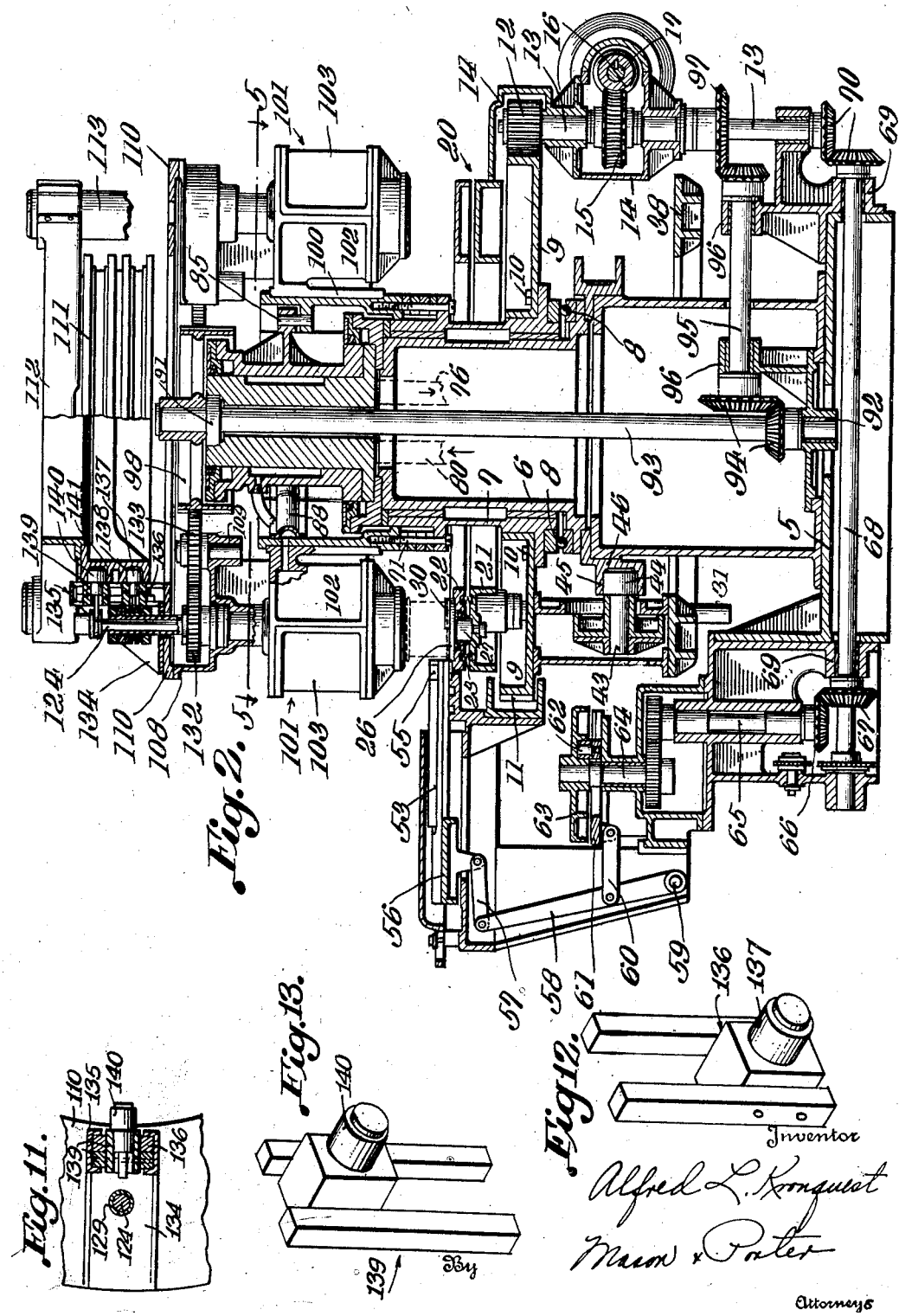
Figure 2 is a vertical cross-section taken on the line 2—2 on Figure 1.
Figure 4:
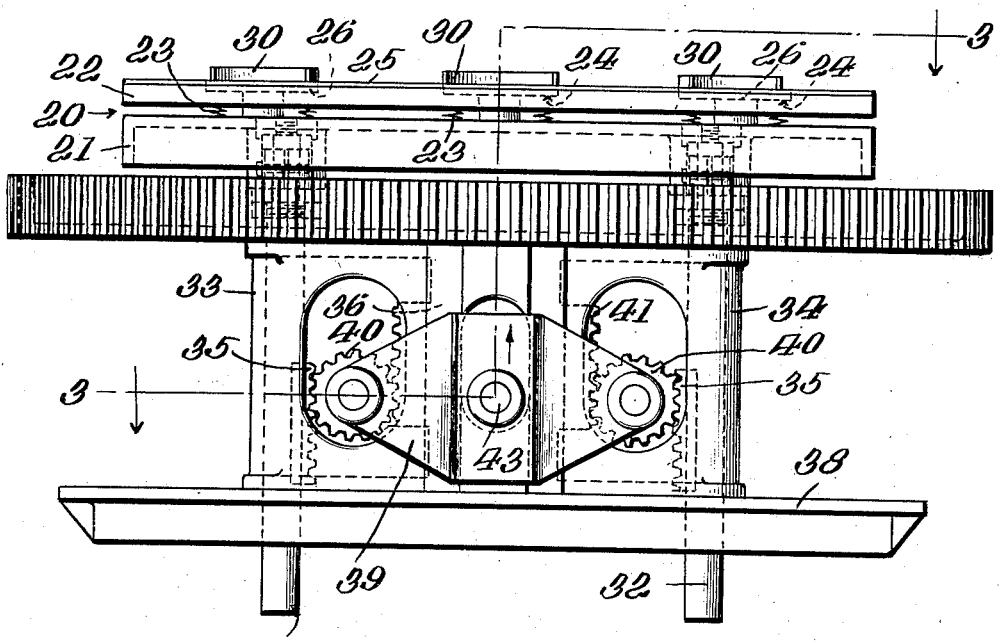
Figure 4 is a face view of one of the table sectors and the elevating mechanism therefor.

The normal relation of the table sector portions 21 and 22 and the supported pads 26 is illustrated in Figures 2 and 4 of the drawings. It will be obvious that movement of the table sector portions 21 and 22 toward each other will cause a projection of the supporting pads 26 out of the recesses 24 in the manner illustrated in Figure 7 of the drawings. Each table sector thus includes yieldably spaced upper and lower portions and container supporting pads mounted on the lower portion and movable through the upper portion.

Figure 3:
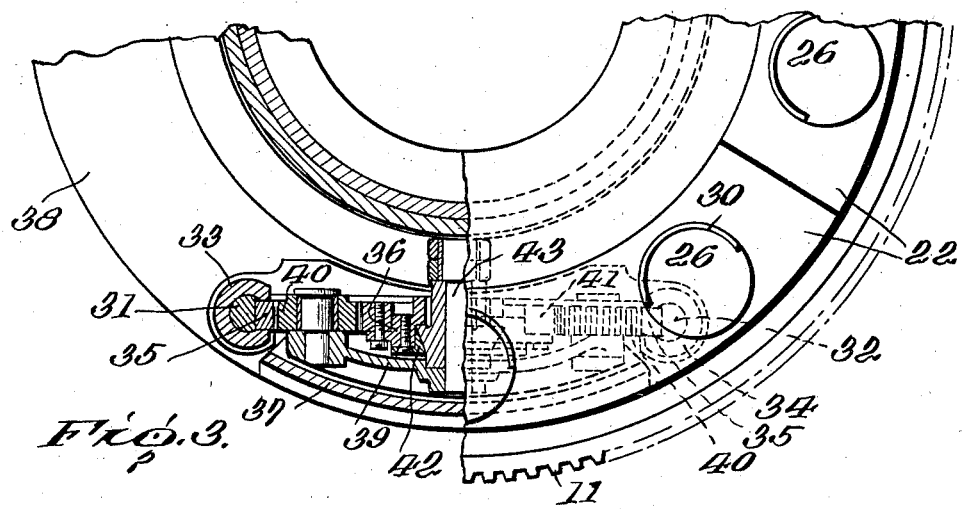
Figure 3 is a fragmentary horizontal section and part plan view taken on the line 3—3 on Figure 4.

Each table sector is mounted on vertically disposed rods 31 and 32. These rods are adapted to slide in sleeves 33 and 34, respectively. The sleeves are open at their inner sides, and each rod is provided with a rack bar 35 which projects through the slotted side of the sleeve. These sleeves 33 and 34 are formed as a part of a bracket web 36 which is attached at its upper end to the ring bracket 9. There is also a depending bracket web or cover plate 37 carried by the ring member 9, and attached to the lower ends of these web bracket members 35 is a ring member 38. These parts all rotate with the sleeve turret 7. The means for raising the table sector is shown more in detail in Figures 3 and 4. Mounted on the web bracket 36 is a crosshead 39 which slides freely vertically on the web bracket member 36. This crosshead carries pinions 40, 40 which mesh with the rack bars 35, 35 carried by the rods 33 and 34. The pinions 40 also mesh with stationary rack bars 41, 41 which are attached to the web bracket member 36. The crosshead is slidingly mounted on the web bracket member 36 by retaining plates 42, 42 (see Figure 3). Fixed to the crosshead is a rod 43 on which a roller 44 is journaled. This roller runs in a cam groove 45 formed in the bracket member 46 which is clamped to the base framing of the machine, as shown in Figure 2. The cam is stationary, and the roller runs along the cam groove as the turret rotates, and will raise and lower the crosshead. When the crosshead moves upward, as indicated by the arrow in Figure 4, this will cause the pinions 40 to move bodily upward, and as they mesh with the stationary rack bars 41, the pinions will be turned in the direction of the arrow, as indicated in Figure 4. The turning and bodily travel of the pinions will cause the rack bars meshing therewith and the rods 31 and 32 attached thereto to move upward, thus lifting the table. The table moves twice as fast as the crosshead, so that by a very limited range of movement of the crosshead, the table can be lifted to a greater extent than the height of the container.

The containers are fed one at a time on to the table as it rotates and placed in the centering means thereon. As shown in Figure 1 of the drawings, the containers are moved along a runway in a continuous line and are delivered to a pair of traveling belts. These traveling belts run over operating wheels 47 and 48 and travel in grooves in a supporting table 49 so as to move the containers along the table. There are guide rails 50 and 51 between which the containers pass, and a timing screw 52 which spaces the containers and places the containers one after another at the feeding-in station.

The containers are fed from the traveling belts on to the traveling table by the feed finger 53. Said feed finger has an arm 54 projecting upwardly therefrom as viewed in Figure 1. The container will be brought into contact with the feed finger by the conveyor belts and when the feed finger is moved inwardly, it will carry the container from the conveyor belts on to the table. The finger 53 also has an arm 55 projecting downwardly therefrom, as viewed in Figure 1, and is timed so as to stop at the forward end of its stroke for a brief period. The table rotates in a clockwise direction as viewed in Figure 1, and this will carry the container placed on the table away from the feed finger 53. It will also bring a container which has been vacuumized and gassed and double seam sealed and resting on the table against the side of the feed finger 53 and in front of the arm 55 so that on the retracting of the feed finger, the container that has been treated and sealed will be removed from the table and placed on to the traveling conveyor belts. The outer face of the arm 55 is tapered, and this will force the container out of the centering guide before the container comes into contact with the face of the feed finger 53.

The feed finger 53 is mounted for reciprocation on a carrier 56. Said carrier has a depending lug to which a link 57 is attached. The link 57 is pivoted to an arm 58 pivoted at 59 to the frame of the machine. The arm 58 is pivoted through link 60, to a slide 61. The slide 61 moves in a suitable guideway, and movement is imparted thereto by a roller 62 cooperating with a cam 63 mounted on a shaft 64. The shaft 64 is connected through suitable gears to a shaft 65, and the shaft 65 carries a bevel gear 66 meshing with a bevel gear 67 on the shaft 68, having bearing as at 69 in the base frame and being driven through bevel gears 70 from the shaft 13. The groove in the cam 63 is shaped so as to give proper reciprocations to the feed finger 53 for placing the containers one at a time on to the traveling table, and it also receives the containers one at a time from the traveling table after they have been treated.

The turret sleeve 7 includes a horizontally projected flange 7a which supports a turret sleeve extension 7b, telescopically mounted on the sleeve 7 and adjustable therealong. By adjusting the sleeve 7b along the sleeve 7 and securing the adjustment by the employment of screws 71 and interposed shims 72, the effective length of the turret assembly 7, 7b can be adjusted to adapt the machine for operating upon cans of different sizes in a manner later to be described.

The column 6 supports a mounting ring 73 on which is secured a valve core 74. The valve core is provided with a vacuum bore 75, connected by a pipe line 76 with any suitable source of vacuum or negative pressure, such as the evacuating pump 76a diagrammatically indicated in phantom in Figure 6, and ports 77 which communicate between the bore 75 and a partial circumferential chamber 78 formed in the outer face of the core. The core 74 also includes a gas bore 79 connected by a pipe 80 with any suitable source of gas supply diagrammatically indicated at 80ª in Figure 6, and the bore 79 is connected by ports 81 with a partial circumferential chamber 82 formed in the outer face of the core (see Figures 5 and 6).

Figure 5:
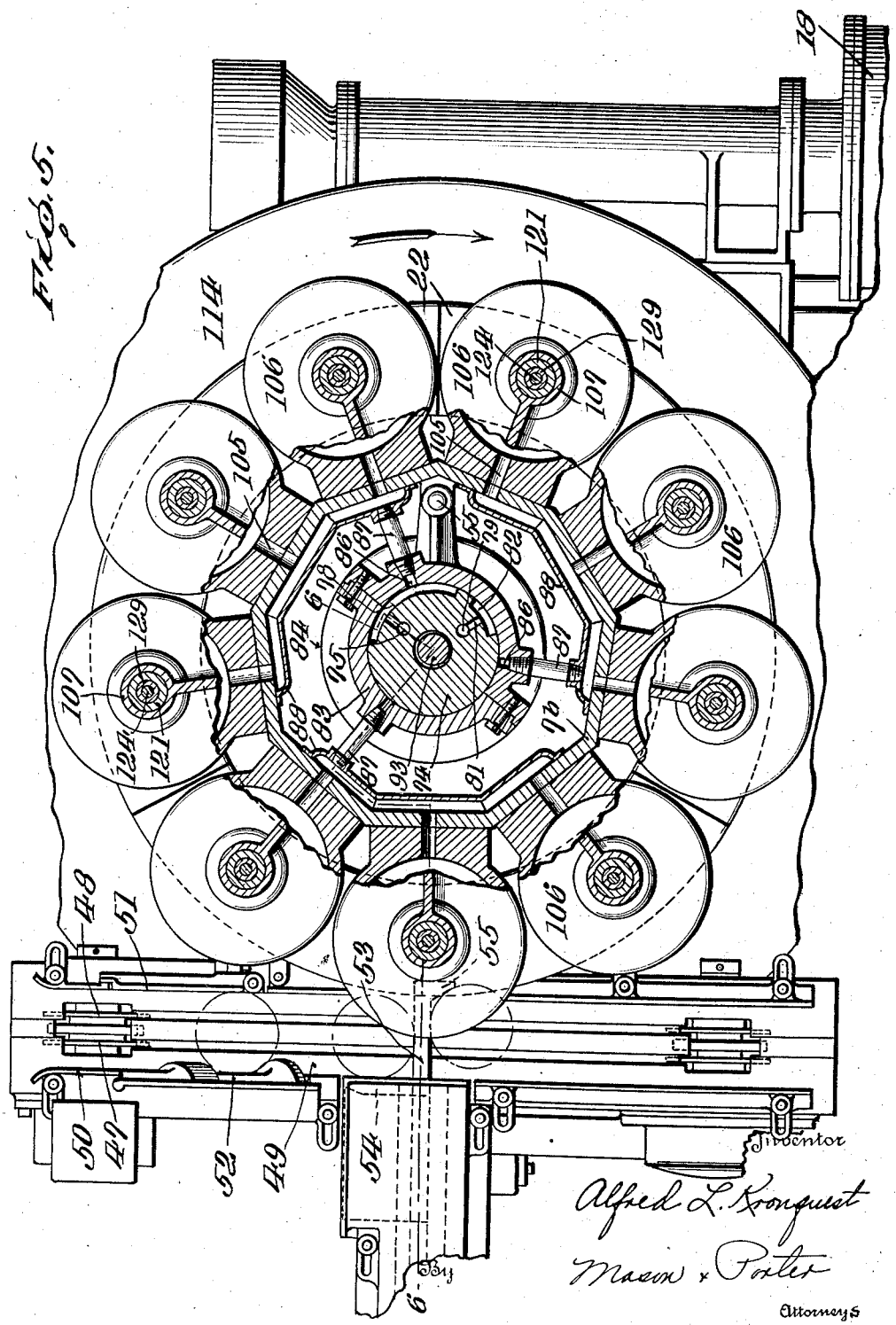
Figure 5 is a horizontal section taken on the line 5—5 on Figure 2.

A valve sleeve 83 snugly fits and is rotatable about the valve core 74 and is formed in two parts, as indicated at 84 in Figure 5. Three longitudinal chambers 86 are formed in equi-distantly spaced relation in the inner face of the sleeve 83 and extending parallel the axis of the sleeve, as shown in Figures 1, 5, 6 and 7, and each chamber 86 is connected by a duct 87 with a manifold 88 secured to the inner wall by the sleeve extension 7b. Each manifold is co-extensive with one of the table sectors for a purpose that will later become apparent.

A gland ring 89 is supported on the mounting ring 73 and engages the base portion of the valve sleeve 83, and a gland ring 90 is supported on the head portion of the valve sleeve 83 and engages the upper peripheral portion of the valve core 74, said rings serving to prevent leakage between the valve core and the valve sleeve which surrounds it.

An anti-friction bearing 91 is mounted in the upper end of the valve core 74. This and a similar bearing 92 supported on the machine base structure provide suitable anti-friction mountings for the vertically and centrally disposed drive shaft 93. (See Figures 2, 5 and 6.) The shaft 93 is driven through bevel gears 94 from a horizontal shaft 95 rotatable in bearings 96 supported on the base, rotation being imparted to the shaft 95 through bevel gears 97, from the shaft 13, hereinbefore mentioned. The shaft 93 extends above the valve core 74 and has affixed thereto a driver gear 98 having an elongated driving surface to enable adjustment of parts, later to be described.

The turret sleeve extension 7b preferably is shaped to present nine individual faces of like size, as shown in Figures 1 and 5 of the drawings. These faces are recessed as at 99 to receive the mounting flanges 100 of bell castings generally designated 101. Each of the nine bell castings includes an integral body portion 102 and a removable body wall 103 between which is formed a seaming chamber 104 which communicates through a port 105 formed in the bell mounting flange and the sleeve wall to which it is affixed with the particular manifold 88. It will be observed by reference to Figure 5 of the drawings that each manifold 88 communicates with three bell chambers 104 and that the bells communicating with a given manifold are centered over the can supporting pads 26 of one table sector.

Each bell includes a ceiling wall 106, an upwardly extending bearing portion 107 and gear casing portion 108, the latter having a bearing extension 109. The gear housing extension portions of all of the bells are joined and stabilized by a connecting ring 110, and it will be understood that the ring and all of the bell units rotate with the turret sleeves 7, 7b.

A cam head 111 is rigidly supported at the head of the machine. This stationary cam head depends from a spider 112 supported upon columns 113 upstanding from the base structure of the machine, and these columns also support the frame ring 114 which surrounds the gear 9 and pinions 12, hereinbefore referred to. (See Figures 1 and 2.)

A bell portion 115 depends from each bell casting 102, 103, said bell portion being reduced in size so that its inside diameter will only slightly exceed the outside diameter of a can receivable therein, so as to form a restricted can receiving chamber 116. It will be observed by reference to Figure 7 of the drawings that a can 117 received in the bell extension almost fills the same. A sealing gasket 118 depends from each bell portion 115.

A double seaming unit generally designated 119 is mounted in each bell chamber 104. In this particular disclosure the seaming units are illustrated as each including a head 120 and an upwardly extended sleeve 121 rotatable in bearings 122 provided in the respective extended bearing portion 107. Additional anti-friction bearings 123 are provided in each head 120 about the knockout pad and chuck shaft 124, and the chuck sleeve 125 in which the chuck shaft is slidably mounted. The chuck 126 secured to the lower end of the sleeve and the chuck shaft are not rotatable. Each chuck 126 is recessed to receive a knockout pad 127 carried at the lower end of the respective shaft 124 which is reciprocable for the purpose of projecting the pad 126 from and returning it to its receiving recess.

Each seaming unit also includes a suitable complement of seaming rollers generally designated 128. These seaming units usually include a pair of first operation seaming rollers and a pair of second operation seaming rollers diametrically opposed. It is to be understood that any suitable seaming unit equipment can be used in the bell housings. Some of these equipments include roller carrying arms pivoted about horizontal axes and others employ arms rockable about vertical axes, such arms being controlled in their movements toward and from the seaming positions by cams of the rotary or longitudinally movable type. In this particular illustration I have generally indicated units in which the roller carrying arms are rockable about vertical axes and are manipulated by longitudinally reciprocable cam heads. These cam heads are carried on sleeves 129 longitudinally reciprocable between the respective sleeves 121 and shafts 124. The control cam heads are designated 130 and are engageable with the roller actuating arm cams 131. An assembly of this type of seaming head is to be found in the United States Letters Patent to Jackson, 1,731,136, issued October 8, 1929. This patent discloses a head in which the roller supporting arms rock about horizontal axes.

A gear 132 is secured upon the upper end of each seaming head sleeve extension 121 and each such gear meshes with an intermediate gear 133 supported on the pad bearing extension 109 and meshing with the elongated master drive gear 98, hereinbefore referred to.

A bracket member 134 is mounted on the ring 110 above each bell housing and each bracket includes a support 135 and an actuator slide assembly 136 adapted to actuate the cam sleeve 129. The actuator slide assembly 136 includes a roller 137 movable in a groove-way 138 of the cam head 111. A similar actuating assembly 139 is provided for the knockout pad rod 124 and each set of such devices includes a roller 140 movable in a cam groove 141 formed in the cam head 111. In Figure 11 there is illustrated a fragmentary horizontal section taken through one of the bracket members 134, 135 and the actuator devices vertically slidable therein, and in Figures 12 and 13 the individual actuator devices vertically slidable in this particular bracket are illustrated in perspective. In Figure 9 of the drawings I have illustrated a diagrammatic development of the cam head 111 and the groove-ways 138 and 141 formed therein. The groove-way 141 includes a dip portion 142 for effecting a downward movement of each knockout pad rod 124 as the respective roller 140 passes through that portion of the groove-way. The groove-way 138 includes a dip portion 143 for effecting a partial lowering of each passing cam head 130 and an actuation of the first operation rollers, and a dip portion 144 for effecting an additional lowering of the respective cam head 130 and an actuation of the second operation rollers.

In Figure 8 of the drawings I have illustrated a diagrammatic development of the table lift controlling cam groove-way 45 formed in the bracket member 46. This groove-way includes a lift portion 145 for effecting a normal lifting of the respective table sectors and an additional rise 146 for additionally lifting the respective can supporting pads.

In operation, the filled cans, each having a cover loosely applied, are serially fed into the machine and on to the table sectors in the manner generally indicated in Figures 1 and 5 of the drawings and described in detail in the Kronquest Patent 1,975,011, hereinbefore referred to. As the turret is rotated in a clockwise direction, the cans are individually received upon the pads of the respective table sectors, and as soon as each table sector has received its complement of three cans the roller 44 of the lifting device engages cam groove-way portion 145 and effects a lifting of the table sector, through the mechanism illustrated in Figures 3 and 4 of the drawings, to the position illustrated in Figure 6 of the drawings. This lifting of the table sector moves the table carrying the three supported cans 117 into engagement with the bell gaskets 118 so as to enclose the filled cans within the chambers 116, 104 preparatory to vacuumizing the chambers and the cans therein.

With the parts moving in this position the chamber 86 and duct 87 associated with the particular manifold communicates with the vacuumizing duct 78 and a vacuum is drawn in the three cans supported upon the raised table sector. It is to be understood that while the cans are sealed in the bells against ingress of air the covers loosely applied to the cans are not moved into contact with the seaming unit chucks 126.

After an interval of vacuumizing the particular chamber 86 and duct 87 will move out of communication with the vacuumizing chamber 78 and discontinue the vacuumizing operation and open communication with the gassing chamber 82 so that the vacuumized condition of the cans will be replaced by the gas entering the chamber, manifold and bells through the gas duct 79 and pipe 80. After an interval of gassing, the communication between the chamber 82 and the chamber 86 will be broken and the gassing operation discontinued.

Upon completion of the vacuumizing and gassing operations the table lifting roller 44 engages the cam groove-way portion 146 and effects an additional lifting of the table sector. However, since the upper, yieldable table portion 22 is engaged with the depending bell portion 115, it is not free to move and remains in sealing contact with the gasket 118, while the lower table sector portion moves toward it in opposition to the springs 23, forcing the pads 26 upwardly out of their receiving recesses 24 and lifting the filled and vacuumized cans against the seaming unit chucks 126.

During this interval of additional lift of the table sector the groove-way portions 143 and 144 will successively function to operate the first and second operation seaming rollers, and as the roller 44 of the table lifting devices encounters the drop portion 147 of the groove-way 45 to effect a lowering or returning of the table sector to its normal position, the groove-way portion 142 of the cam head 111 will function to actuate the knockout pads 127. The vacuumized, gassed and double seam sealed cans are serially removed from the lowered table sector and fed out of the machine in the manner described in the Kronquest patent hereinbefore referred to.

In Figure 10 of the drawings I have diagrammatically indicated a sector A in which the table sector loading is accomplished, a sector B in which vacuumizing is effected, a sector C in which gassing is effected, a sector D in which seaming or closing is effected, and a sector E in which unloading of the cans is effected.

It is desirable at times to adapt the machine to use in conection with cans of different sizes. By increasing or diminishing the number of shims 72 interposed between the turret sleeve portions 7 and 7b it is possible to vary the effective length of this sleeve, and by correspondingly substituting depending bell portions 115 of different dimensions, the spacing between the table sectors and the bells can be varied to accommodate cans of different sizes. The extension or contraction of the telescopic portions 7, 7b will of course alter the position in space of the master gear 98, and for this purpose the peripheral surface of the gear is elongated so that it will function in any position of adjustment of the parts.

While the invention is described in detail as applied to a machine with which is associated a means for relieving the vacuum with an inert gas before sealing the can, it will be understood that from certain aspects of the invention the machine may be used for vacuumizing and sealing a can without relieving the vacuum with the inert gas. Particular attention is called to the fact that the can is so positioned relative to the chuck that the end which is to be seamed to the can is held centered relative to the can but is not clamped tightly against the can so that a vacuum can be readily drawn on the can and gas supplied thereto. To this end the can is preferably provided with detents either in the flange of the can body or in the closure end therefor, so as to hold the closure end sufficiently off from the flange to permit the gas to enter the can.

As has been previously stated, the cans are filled and have heads or covers loosely applied thereon when they are fed into the machine. These heads may be lightly clinched on so as to avoid any displacement during the vacuumizing and gassing operations, and if desired, engaging portions of the can bodies and heads may be equipped with suitable protuberances to assure slight spacing of these parts and free egress and ingress of air and gas during said operations.

It is obvious that many changes in the details of the construction and arrangement of parts may be made without departing from the spirit of the invention as set forth in the appended claims.

I claim:

1. In a machine of the character described, a traveling table, a plurality of bells, each having a container sealing mechanism therein and adapted to travel with the table, means to feed filled containers to the table, means for bringing the table and bells into mutual contact to enclose the bells against ingress of air, means for first drawing a vacuum in the containers enclosed in the bells, means for replacing the vacuum in the bell enclosed containers with a gas, means for moving the enclosed containers against the sealing mechanism, means for actuating the sealing means for sealing the bell enclosed containers, means for separating the table and bells, and means for discharging the sealed containers from the table.

2. In a machine of the character described, a traveling table composed of independently movable sectors, a plurality of bells each having a ceiling portion and a container sealing mechanism therein which travels with the table and includes rotatable actuator devices extending through said ceiling portion, means to feed filled containers to the table, means for moving the table sectors serially toward the bells to place successive groups of containers in the bells and enclose them against ingress of air, means for first drawing a vacuum in each group of bell enclosed containers, means for replacing the vacuum in each said group of bell enclosed containers with a gas, means for moving the enclosed containers against the sealing mechanism, means for actuating the sealing mechanism for sealing the bell-enclosed containers, means for moving the table sectors serially away from the bells, and means for discharging the sealed containers from the table sectors.

3. In a machine of the character described, a traveling table composed of independently movable sectors, a plurality of bells each having a container sealing mechanism therein including a chuck and co-acting seaming rollers and adapted to travel with the table, means to feed filled containers to the table, means for moving the table sectors serially a distance toward the bells to place successive groups of containers in the bells and enclose them against ingress of air, means for first drawing a vacuum in each group of bell enclosed containers, then replacing the vacuum in each said group of bell enclosed containers with a gas, means for then moving each particular table sector an additional distance after the containers thereon have been vacuumized and then gassed to cause the sector carried containers to engage the chucks, means for actuating the sealing mechanisms to seal the chuck engaged containers, means for moving the table sectors serially away from the bells, and means for discharging the sealed containers from the table sectors.

4. In a machine of the character described, a traveling table composed of independently movable sectors, a plurality of bells each having a container sealing mechanism therein including a chuck and co-acting seaming rollers and adapted to travel with the table, means to feed filled containers to the table, means for moving the table sectors serially a distance toward the bells to place successive groups of containers in the bells and enclose them against ingress of air, means for first drawing a vacuum in each group of bell enclosed containers, then replacing the vacuum in each said group of bell enclosed containers with a gas, means for then moving each particular table sector an additional distance after the containers thereon have been vacuumized and then gassed to cause the sector carried containers to engage the chucks, means for actuating the sealing mechanisms to seal the chuck engaged containers, means for moving the table sectors serially away from the bells, means for discharging the sealed containers from the table sectors, and means for altering the spaced relation of the table and the chucks to adapt the machine for operations upon containers of different sizes.

5. In a machine of the character described, a rotatable table composed of lift sectors, means for feeding filled containers on to the sectors, a turret rotatable with the table and supporting thereon a plurality of bells each including therein a sealing unit composed of a chuck and double seaming rollers, means for lifting the table sectors one at a time to serially enclose groups of containers in the bells against ingress of air and for lowering the sectors in similar manner to remove the containers from the bells, means for first vacuumizing, then gassing and then causing the associated sealing units to function and effect a sealing of the containers enclosed in said bells while each sector remains lifted, and means for discharging the sealed containers from the lowered sectors.

6. In a machine of the character described, a rotatable table composed of lift sectors, means for feeding filled containers on to the sectors, a turret rotatable with the table and supporting thereon a plurality of bells each including therein a sealing unit composed of a chuck and double seaming rollers, means for lifting the table sectors one at a time a distance to serially enclose groups of containers in the bells against ingress of air, means for first vacuumizing, then gassing the enclosed containers, means for lifting the lifted sectors an additional distance to engage the enclosed containers with the chucks in the enclosing bells thereby to effect a sealing of said enclosed containers, means for lowering the sectors upon completion of the sealing of the groups of containers thereon, and means for discharging the sealed containers from the lowered sectors.

7. In a machine of the character described, a rotatable turret supporting a plurality of bells, a table movable with the turret for receiving filled containers, means for moving the table into engagement with the bells to place containers therein and enclose them against ingress of air, means for vacuumizing and gassing the containers while enclosed in the bells, can sealing means including chucks and double seam rollers mounted in the bells, means for moving the containers into engagement with the chucks to effect a container sealing function following the gassing of the containers and while the containers remain enclosed within the bells, all being effected during one complete revolution of the turret, said table including yieldably spaced upper and lower portions and container supporting pads mounted on the lower portion and movable through the upper portion.

8. In a machine of the character described, a container supporting and lifting table comprising an annulus formed of independently movable sectors, each said sector including an upper portion and a lower portion, means for yieldably holding the portions in spaced relation, and container supporting pads mounted on the lower portion and movable through the upper portion.

9. In a machine of the character described, a container supporting and lifting table comprising an annulus formed of independently movable sectors, each said sector including an upper portion and a lower portion, means for yieldably holding the portions in spaced relation, and container supporting pads mounted on the lower portion and movable through the upper portion, said upper portions having recesses therein to receive the pads and packed stem receiving apertures, and each said pad having a depending stem operable in an aperture and secured to a table lower portion.

10. In a machine of the character described, a container supporting and lifting table comprising an annulus formed of independently movable sectors, each said sector including an upper portion and a lower portion, means for yieldably holding the portions in spaced relation, container supporting pads mounted on the lower portion and movable through the upper portion, said upper portions having recesses therein to receive the pads and packed stem receiving apertures, and each said pad having a depending stem operable in an aperture and secured to a table lower portion, a plurality of container treating bells mounted above each table sector and each embodying a container sealing unit including a chuck and seaming rollers, and means to move the table sectors upwardly to first press the upper portions thereof against the bells to enclose the containers against air ingress, means for treating the containers while enclosed, means for lifting the table sector lower portions an additional distance to lift the pads and engage the containers with the chucks, and means for actuating the sealing units to seal the enclosed containers.

11. In a machine of the character described, a container supporting and lifting table comprising an annular formed of independently movable sectors, a plurality of container treating bells mounted above each table sector and each embodying a sealing unit including a chuck and seaming rollers, means yieldably spaced above the table sectors and engageable with the bells for closing them against air ingress, said bell closing means including stemmed container supporting pads and packed apertures through which the pad stems depend, said stems being secured to the table sectors, means for lifting the table sectors to engage the closing means with the bells and enclose the containers in the bells, means for treating the containers while enclosed, means for lifting the table sectors an additional distance to lift the pads and engage the containers with the chucks, and means for actuating the sealing units to seal the enclosed containers.

12. In a machine of the character described, a container supporting and lifting table comprising an annulus formed of independently movable sectors, a plurality of container treating bells mounted above each table sector and each embodying a sealing unit including a chuck and seaming rollers, means yieldably spaced above the table sectors and engageable with the bells for closing them against air ingress, said bell closing means including stemmed container supporting pads and packed apertures through which the pad stems depend, said stems being secured to the table sectors, means for lifting the table sectors to engage the closing means with the bells and enclose the containers in the bells, means for treating the containers while enclosed, means for lifting the table sectors an additional distance to lift the pads and engage the containers with the chucks, and means for actuating the sealing units to seal the enclosed containers, each said bell having a main body portion for housing the sealing unit and including a removable wall portion, and a depending container enclosing shell portion of only slightly greater diameter than the containers to be enclosed and removably and replaceably secured to said main body portion to adapt the machine for operations upon containers of varied sizes.

13. In a machine of the character described, a container supporting and lifting table comprising an annulus formed of independently movable sectors, a plurality of container treating bells mounted above each table sector and each embodying a sealing unit including a chuck and seaming rollers, means yieldably spaced above the table sectors and engageable with the bells for closing them against air ingress, said bell closing means including stemmed container supporting pads and packed apertures through which the pad stems depend, said stems being secured to the table sectors, means for lifting the table sectors to engage the closing means with the bells and enclose the containers in the bells, means for treating the containers while enclosed, means for lifting the table sectors an additional distance to lift the pads and engage the containers with the chucks, means for actuating the sealing units to seal the enclosed containers, and a rotatable turret, said bells and said table being mounted for rotation with said turret.

14. In a machine of the character described, a container supporting and lifting table comprising an annulus formed of independently movable sectors, a plurality of container treating bells mounted above each table sector and each embodying a sealing unit including a chuck and seaming rollers, means yieldably spaced above the table sectors and engageable with the bells for closing them against air ingress, said bell closing means including stemmed container supporting pads and packed apertures through which the pad stems depend, said stems being secured to the table sectors, means for lifting the table sectors to engage the closing means with the bells and enclose the containers in the bells, means for treating the containers while enclosed, means for lifting the table sectors an additional distance to lift the pads and engage the containers with the chucks, means for actuating the sealing units to seal the enclosed containers, each bell having a main body portion for housing the sealing unit and including a removable wall portion, and a depending container enclosing shell portion of only slightly greater diameter than the containers to be enclosed, and a rotatable turret, said bells and said table being mounted for rotation with said turret.

15. In a machine of the character described, a container supporting and lifting table comprising an annulus formed of independently movable sectors, a plurality of container treating bells mounted above each table sector and each embodying a sealing unit including a chuck and seaming rollers, means yieldably spaced above the table sectors and engageable with the bells for closing them against air ingress, said bell closing means including stemmed container supporting pads and packed apertures through which the pad stems depend, said stems being secured to the table sectors, means for lifting the table sectors to engage the closing means with the bells and enclose the containers in the bells, means for treating the containers while enclosed, means for lifting the table sectors an additional distance to lift the pads and engage the containers with the chucks, means for actuating the sealing units to seal the enclosed containers, each bell having a main body portion for housing the sealing unit and including a removable wall portion, and a depending container enclosing shell portion of only slightly greater diameter than the containers to be enclosed, and a rotatable turret, said bells and said table being mounted for rotation with said turret, a column about which said turret is rotatable, a vertically disposed drive shaft disposed centrally within and extending above the column, an elongated gear on the extended end of the shaft, and a stationary cam mounted above said elongated gear, said sealing units actuating means including gearing trains individually associated with the bells and meshing with the elongated gear, and thrust imparting devices engaged with the cam.

16. In a machine of the character described, a rotatable table composed of lift sectors, means for feeding filled containers on to said sectors, a turret rotatable with the table and supporting thereon a plurality of bells, each bell including a sealing unit composed of a chuck and double-seaming rollers, means for lifting the table sectors one at a time to serially enclose groups of containers in the bells against ingress of air and for lowering the sectors in a similar manner to remove the containers from the bells, means for treating the containers while enclosed in the bells, said sealing units operating to effect a sealing of the containers enclosed in said bells while each sector remains lifted, and means for discharging the sealed containers from the lowered sectors.

ALFRED L. KRONQUEST.